United States Patent Office 3,046,282
Patented July 24, 1962

3,046,282
PHTHALOCYANINE PIGMENTS AND METHOD OF MAKING SAME
Geoffrey R. Buckwalter, Flemington, N.J., assignor to Fred'k H. Levey Company, Inc., New York, N.Y., a corporation of New York
No Drawing. Filed June 29, 1960, Ser. No. 39,443
6 Claims. (Cl. 260—314.5)

The present invention relates to pigmentary copper phthalocyanine and relates more particularly to an improved, highly effective and highly economical method of converting crude copper phthalocyanine, or the equivalent thereof, to pigmentary copper phthalocyanine of exceptionally soft texture and high coloring power, especially adapted for use as a colorant in printing inks and the like.

Copper phthalocyanine has long been known to be a highly desirable colorant, especially because of its light-fastness and brilliant hues, and various methods have been proposed for producing the crude chemical compound, both halogenated and halogen-free. However, the proposed procedures have resulted in crystalline materials of particle size and other properties which render them entirely unsuited for use as a pigment in the crude state. The particle size of commercially available crude copper phthalocyanines is usually within the range of 30–40 microns and is entirely too coarse for pigmentary purposes, which require a particle size of the order of one micron or less. Further, these coarse crystals are not readily susceptible to reduction to satisfactory pigments by ordinary grinding or ball milling methods.

A procedure known as acid pasting has been developed for converting the crude crystals to particle sizes within the pigmentary range. By this acid pasting procedure, the crude copper phthalocyanine is dissolved in concentrated sulfuric acid and thereafter the solution is diluted, or drowned, with large quantities of water, whereby the copper phthalocyanine is precipitated as extremely fine particles within the pigment-size range. This acid pasting procedure is applicable both to halogenated copper phthalocyanine or to the halogen-free copper phthalocyanine.

Copper phthalocyanine, particularly the halogen-free copper phthalocyanine, has been recognized to exist in two different crystal forms, namely, the alpha form and the beta form, the alpha form containing more bound energy and being meta stable with respect to the beta form. Under certain conditions, namely when brought into contact with certain aromatic organic solvents, generally referred to by the art as "crystallizing solvents," the halogen-free copper phthalocyanine of the alpha type tends to change over to the more stable beta form. These two forms of copper phthalocyanine are distinguishable by their X-ray diffraction patterns.

The crude copper phthalocyanines are ordinarily of the beta form, but when subjected to ordinary grinding or to acid pasting, the halogen-free copper phthalocyanine is transformed to the less stable alpha form.

In changing from the alpha form to the beta form, the halogen-free copper phthalocyanine exhibits a strong tendency toward crystal growth with a corresponding loss in color strength of the pigment. It has been observed, as noted above, that this crystal growth is promoted by exposing the pigment in alpha form to organic solvents of an aromatic type, normally used in the manufacture of paints, lacquers and the like.

The halogenated copper phthalocyanines have been recognized to be stable against this objectionable crystal growth. However, they have usually tended toward a reddish shade of blue, as distinguished from the brilliant blues of the acid-pasted, halogen-free copper phthalocyanine pigment, produced by the acid pasting of crude, halogen-free copper phthalocyanine, or crude copper phthalocyanine containing only small proportions of chlorine, for instance.

It has been proposed to stabilize the acid-pasted, halogen-free copper phthalocyanine against crystal growth, and consequent loss in tinctorial strength, by treating the alpha particles of the pigment resulting from acid pasting with an aromatic hydrocarbon solvent, such as referred to above, known to produce crystal growth and generally designated "crystallizing solvents," while subjecting the mixture to a grinding action.

According to one aspect of this proposed procedure, the copper phthalocyanine pigment in alpha form, resulting from acid pasting of the crude, is subjected to ball milling in admixture with one of the crystallizing solvents and a grinding aid, such as salt. This grinding in the presence of a crystallizing solvent is reported to convert the alpha pigment to the stable beta form while preventing excessive crystal growth and thereby rendering the pigment immune to subsequent crystal growth and loss of tinctorial strength when mixed into paints and the like containing such aromatic crystallizing solvents.

It has also been proposed to treat the acid pasted, halogen-free copper phthalocyanine by subjecting the phthalocyanine and a solid grinding aid, and an amount of crystallizing solvent sufficient to form a thick paste, to vigorous shearing and mixing action, as by means of a dough mixer. It has further been proposed to reduce crude monochlor copper phthalocyanine to pigmentary size by the vigorous mixing, just described, substituting diethylene glycol for the crystallizing solvent prescribed in the case of halogen-free copper phthalocyanine.

The copper phthalocyanine pigments resulting from these previously proposed procedures have generally lacked the softness of texture, the high tinctorial strength and rapid color development so desirable in pigments, especially pigments for use in printing inks of superior quality. In an effort to improve the texture and tinctorial qualities of these pigments, it has been proposed to dissolve in the crystallizing solvent used in the grinding operation a dispersant containing long-chain fatty acid radicals.

It is a primary object of my present invention to provide a process whereby pigmentary copper phthalocyanines of improved texture and tinting strength, and especially adapted as colorants for use in the manufacture of ink and the like, can be directly and economically produced from crude copper phthalocyanines while avoiding the necessity of acid pasting, ball milling or otherwise grinding the crude.

It is a further object of my invention to provide a process, having the advantages just mentioned, which is equally applicable to the treatment of either halogen-free, or halogenated, copper phthalocyanine and whereby the use of toxic, highly-inflammable, aromatic solvents, the so-called "crystallizing solvents," and of dispersants, may be avoided.

I have discovered, most surprisingly, that pigmentary copper phthalocyanines especially suited for use as a colorant for printing inks, and the like, can be economically produced from crude copper phthalocyanine, either completely or partially halogenated or halogen-free, by subjecting the crude to vigorous mixing under conditions of viscous shearing action in admixture with a grinding aid and 2-methyl-2,4-pentanediol, sometimes herein called pentanediol, for brevity.

The pigmentary copper phthalocyanine produced in accordance with my present invention is unique in various respects and is superior to all other copper phthalocyanine pigments, of which I am aware, in its ink compounding properties, especially in texture, or softness of feel, tinctorial strength and rapid color development characteristics.

My process is with advantage carried out in apparatus of the type generally characterized as a dough mixer, for instance a Day mixer or flusher or a Baker-Perkins Universal mixer or the Werner-Pfleidler mixer, by which the mixture is subjected to viscous shearing action, until optimum color has been developed.

Grinding aids suitable for my present process are well-known to the art. The selected grinding aid should be one which is water-soluble, so as to facilitate its removal from the pigment by water-washing, and should be of a fine particle size. Micropulverized salt has been used with particular advantage for this purpose.

The proportion of grinding aid used and also the proportion of the pentanediol used may be varied over a considerable range. Where the grinding aid is extremely finely divided, the optimum proportion has generally been found to be less than where a coarser grinding aid is used. The amount and fineness of the grinding aid also influences the optimum proportion of the pentanediol used in the mixing operation. A dependable criterion as to the proportion of pentanediol used is that it should be present in an amount such that, together with the pigment and the grinding aid and any water present, it forms a relatively stiff or highly viscous pasty mass. Best results have been obtained when the material being worked upon by the mixer is of a stiffness such that the mass is subjected to maximum shearing stresses, commensurate with the capacity of the mixer, but of sufficient plasticity that the mass holds together without crumbling.

The proportion of pentanediol added has been found materially to influence the grinding time. Where too small a proportion of the pentanediol is added, the required grinding time generally has been found to increase. Too great a proportion of the pentanediol has been found to result in a pigment of weaker color.

I have frequently found it advantageous to supplement the pentanediol by a minor proportion of water. The proportion of water thus added should be insufficient to dissolve any substantial proportion of the grinding aid and should be less than the amount of pentanediol present, advantageously not more than about one part water for each two parts of the pentanediol.

Because of the work done on the mixture during the mixing operation, considerable heat is normally generated. Excessive temperatures have been found deleteriously to affect the color value of the resultant pigment, the color tending toward what is known in the art as "dirty." To avoid this condition, I have found it most desirable to use a mixer provided with a cooling water jacket or other means by which the temperature of the mixture can be maintained at not over about 60–80° C.

The duration of the mixing operation is dependent upon other factors, noted above, and is subject to considerable variation. The mixing should be continued until a pigment of optimum color or shade is obtained.

Following the mixing operation, the grinding aid and the pentanediol are washed from the pigment by water and the resultant pigment dried by heating, or else flushed into a suitable organic liquid vehicle by procedure well-known to this art. The dried pigment, or the liquid vehicle containing the pigment in suspension, may then be compounded with other desired constituents for producing printing ink or other coloring materials. Where the pigment is flushed into an organic vehicle, the vehicle selected should preferably be one of the constituents to be used in the compounding of the ink or the like.

It will be understood that the expression "crude copper phthalocyanine" as used herein and in the appended claims is intended to include both crude and acid pasted halogen-free copper phthalocyanine and also crude or acid pasted copper phthalocyanine containing combined halogen, e.g., chlorine, in proportions ranging up to 4.5–5% by weight.

While the invention is of particular utility as applied to the treatment of crude copper phthalocyanine since it avoids the necessity of the conventional acid pasting step, the process, as just noted, is also applicable to the treating of copper phthalocyanines resulting from the acid pasting of such crudes. In either case, a pigmentary copper phthalocyanine having the desirable, extraordinary properties noted above is obtained.

The invention and the advantages thereof will be illustrated by the following specific examples:

*Example I*

In this operation, the following materials in the indicated proportions, by weight, were used:

| | Parts |
|---|---|
| Copper phthalocyanine crude | 60 |
| Grinding aid | 550 |
| 2-methyl-2,4-pentanediol | 90 |

The crude copper phthalocyanine used was an article of commerce obtained from General Dyestuff Corporation under the designation "Heliogen Blue UP Base SF" and comprised 91–93% copper phthalocyanine and 2.0±0.2% bound chlorine. The grinding aid was common salt (sodium chloride) which had been micropulverized by a hammer mill.

The crude copper phthalocyanine and the grinding aid, in the above indicated proportions, were charged to a Day flusher provided with a water-cooling jacket and were dry mixed therein. The pentanediol was then added and the mixing continued resulting in a stiff, pasty mass. As the mixing continued, heat was generated and cooling water was passed through the jacket of the mixer so as to maintain the temperature between 60° and 80° C. The mixture was thus continued for about 10 hours at the end of which time water was added to the mixture to form a slurry and the slurry was flowed into a wooden mixing tub. Further water was then added in sufficient amount completely to dissolve the salt, the copper phthalocyanine remaining suspended.

The pH of the mixture may then be adjusted to remove impurities. For this purpose, the pH was reduced to within the range of about 0.5–1.5 by the addition of sulfuric acid to solubilize and remove metal ions and basic decomposition products present in the crude. The pH may be adjusted to other ranges depending on the nature of impurities present in the crude phthalocyanine being used. The batch was then heated to 60–70° C. and filtered and washed with water until free from sodium chloride, pentanediol and other water-soluble impurities. The pigment was then separated from the water by filtration and oven dried at a temperature within the range of 60° to 80° C. and the dried material micropulverized to give a finished dry color.

It will be understood that where impurities, such as noted above, are not present, adjustments of the pH to effect removal thereof may be omitted.

Instead of drying and micropulverizing the filter cake, the material, still wet with water, may be flushed by well-known procedure into one of the liquid components of the ink, or the like, in which the colorant is to be used.

The dry color obtained in lump form from the drying operation has been found to be unusually soft in texture, much softer than when prepared by a comparable procedure using an organic liquid such as xylene or aniline in place of the pentanediol. The lumps of material thus obtained in accordance with my present invention are so soft that they are readily disintegrated by slight pressure between one's fingers and, therefore, very mild micropulverizing action is sufficient to reduce the lumps to the finished pigment form.

The softness of texture of my improved pigment is also indicated by the fact that when ground into an ink vehicle or varnish, color strength is very rapidly developed. For example, 1.9 grams of ink varnish and 1.1 grams of the dry pigment, prepared in accordance with the preceding example, were mixed on the plate of a Hoover muller and given 4 x 50 grinding revolutions with full load weight on the machine. This test was then repeated with no weights on the machine. Similar tests were then made for comparative purposes using a pigment manufactured by the identical method except that diethylene glycol was substitued for the pentanediol. It was found that the pigment of my present invention was softer grinding and when diluted with white pigment in accordance with the conventional test for tinctorial strength, developed greater strength, both when the machine was loaded and when the machine was unloaded, than did the comparative pigment.

Further, my product when evaluated in ink in comparison with a copper phthalocyanine pigment of commerce, namely, one marketed as Imperial No. X-2480, shows the following results:

Masstone _____ Very slightly lighter.
Undertone _____ Equal in shade and cleanliness.
Tint _____ Equal in shade and cleanliness.
Color strength _____ 10% greater.
Body _____ Equal.

As previously indicated herein, the proportions of the various ingredients may be varied considerably without loss of the benefits of my present invention. But if the proportion of pentanediol is too greatly reduced, for instance to a proportion of 60 parts pentanediol to 60 parts of crude and 550 parts of the grinding aid, the grinding time has been found to increase materially, namely, to 14–18 hours.

In the foregoing specific example, the grinding aid used showed the following U.S. gauge screen analysis:

|  | Percent |
|---|---|
| Remaining on 100 mesh | 1.5 |
| Remaining on 200 mesh | 19.5 |
| Remaining on 325 mesh | 31.0 |
| Through 321 mesh | 48.0 |

The ratio of grinding aid to the crude copper phthalocyanine is advantageously within the range extending from about 7:1 to about 10:1. Though ratios somewhat without this range may be used, it has been found that a lower ratio usually results in longer grinding time or weaker batches. A ratio higher than the above-noted range, while permissible, has shown no apparent advantage. The above-noted disadvantages of using ratios below the indicated range are less apparent where a smaller particle size grinding aid is used.

As previously noted, water may be substituted for a portion of the pentanediol used in the grinding operation. By the use of water in this way, the proportion of pentanediol used may be proportionately reduced, thus effecting economy of operation, while maintaining the mass within the mixer at the desired viscosity.

That aspect of the invention in which water is substituted for a portion of the pentanediol is illustrated by the following example:

*Example II*

In this operation, the following constituents in the indicated proportions by weight were used:

|  | Parts |
|---|---|
| Phthalocyanine crude | 125 |
| Grinding aid, micropulverized salt | 1500 |
| 2-methyl-2,4-pentanediol | 175 |
| Water | 90 |

The phthalocyanine crude used in this operation was commercially obtained, and had a minimum purity of at least 94.0%, a moisture content not over 0.5% and a chlorine content not exceeding 0.25%. The micropulverized grinding aid was sodium chloride having the particle size analysis given in the preceding example.

The crude copper phthalocyanine and the grinding aid, in the indicated proportions, were placed in a Baker-Perkins Universal mixer and the pentanediol and water added. The pentanediol and water may be either premixed or separately added. The mixer was then started and considerable heat was generated resulting in the evaporation of a substantial amount of the water. After three hours of mixing, the mixture became excessively stiff and an additional 50 parts of water was added to replace that evaporated and the mixing continued for a further three-hour period. The mixture was then dispersed in water to form a slurry and dissolve the sodium chloride and heated to a temperature of about 90° C. The suspended pigment was then separated from the water and pentanediol by filtration and water-washed free from salt.

I have generally found that where water is used in conjunction with the pentanediol, as in the present example, the texture of the resultant pigment is even superior to that resulting from the use of the pentanediol without water.

I have also, with advantage, added to the mixture being subjected to the viscous shearing or grinding, in operations in which water is used in conjunction with the pentanediol, a small proportion of a water-soluble thickener, for instance, cellulose gum. Such use of a thickener in conjunction with the water makes it possible further to increase the proportion of pentanediol replaced by water and thus reduce the portion of pentanediol used, without sacrificing the properties of the finished pigment. An operation of this type is illustrated by the following example:

*Example III*

In this operation, the materials used and proportions thereof by weight are indicated in the following tabulation:

|  | Parts |
|---|---|
| Phthalocyanine crude | 150 |
| Grinding aid, micropulverized salt | 1275 |
| 2-methyl-2,4-pentanediol | 190 |
| Water | 45 |
| Cellulose gum | 1.5 |

The mixing was carried out, as in the preceding example, in a Baker-Perkins Universal mixer. The crude was a commercial product marketed as "Phthalocyanine Blue B4E Base" (code 3428) by Pittsburgh Coke and Chemical Company having a minimum purity of 95% and being substantially halogen-free. The grinding aid was that described in Example I. The mixing was carried on for a period of six hours while maintaining the temperature at about 50° C. At the end of the mixing period, the mixture was dispersed in water and heated to a temperature of 90° C. and held at that temperature for about 15 minutes. The pigment was then filtered, washed free of sodium chloride and oven dried. The resultant dried pigment was found to have exceptional soft texture, the lumps of the dry pigment being easily crushed between the fingers.

As compared with a commercial copper phthalocyanine pigment marketed as "Monastral Blue BG–297–D," the product of the present example had the following color characteristics:

| Masstone | Slightly darker. |
|---|---|
| Undertone | Equal. |
| Tinting strength | Equal. |
| Strength | 4% greater. |
| Body | Equal. |

Though the product of my present process is not entirely stable as to color strength when subjected to the conventional test of boiling in xylol, its color stability in the presence of conventionally used ink solvent under conditions normally encountered has been found adequate for use in the compounding of printing inks and for many other purposes. When boiled in xylol for one hour, in accordance with a well-established test, the loss in color strength or tinctorial strength by my product has been found not to exceed about 25% and is usually within the range of 7% to 25%.

The loss in color strength of the product of the foregoing Example I was found to fall within that range and the product was found to contain approximately 2% of chemically bound chlorine, the same proportion of chlorine present in the crude copper phthalocyanine.

When boiled in xylol for one hour, the product of Example II was found to lose approximately 10% of its original tinctorial strength and the product of Example III lost about 28% of its initial tinctorial strength. However, as previously noted, these products have been found adequately stable and eminently satisfactory for use as the colorant in printing inks, regardless of their color instability when boiled in xylol.

I claim:

1. A method of producing pigmentary copper phthalocyanine having improved texture and tinctorial strength and especially adapted to use as a colorant in printing ink, which comprises subjecting crude copper phthalocyanine, in admixture with a granular, water-soluble grinding aid and 2-methyl-2,4-pentanediol to form a viscous, pasty mass, to vigorous shearing action, and removing the grinding aid and 2-methyl-2,4-pentanediol from the resultant pigment by water-washing.

2. The process of claim 1 in which the temperature of the mixture during the shearing treatment is maintained below 80° C.

3. The process of claim 1 in which the ratio of grinding aid to crude copper phthalocyanine is within the range of 7:1 to 10:1.

4. The process of claim 1 in which the proportion of 2-methyl-2,4-pentanediol is at least equal to that of the crude phthalocyanine.

5. The process of claim 1 in which water is substituted for a minor proportion of the 2-methyl-2,4-pentanediol.

6. The process of claim 5 in which a water-soluble thickening agent is also included in the mixture subjected to the vigorous shearing action.

References Cited in the file of this patent

UNITED STATES PATENTS

| | | |
|---|---|---|
| 2,556,726 | Lane | June 12, 1951 |
| 2,669,569 | Mutaffis | Feb. 16, 1954 |
| 2,950,285 | Miller et al. | Aug. 23, 1960 |
| 2,982,666 | Chun et al. | May 2, 1961 |